UNITED STATES PATENT OFFICE 2,650,171

METHOD OF MAKING LIGHTWEIGHT COATED AGGREGATE GRANULES

Cecil F. Schaaf, Flint, Mich.

No Drawing. Application February 25, 1950, Serial No. 146,385

2 Claims. (Cl. 117—70)

The present invention relates to the production of lightweight aggregates for use in concrete mixes and in particular, to a method of pre-treating the granules of the aggregate to form a coating thereon so that when the aggregate is mixed with proportional amounts of cement and water a concrete mixture will be formed which upon setting and hardening will have certain ideal attributes.

One object of the invention is to pre-treat lightweight aggregates for use in cement mixtures in which excessive bleeding is greatly reduced, due to the fact that the granular particles of the aggregate are more or less waterproofed and thus prevent the escape of moisture of absorption.

Another object is to provide a method of pre-treating lightweight aggregates to reduce shrinkage which results from the reduction in the amount of mixing water per bag of cement in the concrete mixture formed from the pre-treated lightweight aggregate.

Another object is to produce lightweight aggregates for use in cement mixtures in which at least 15 per cent less water is used in the concrete mix, which renders the concrete less permeable and more waterproof since the coated aggregate particles do not absorb the free water in the concrete while hardening, but permit the water to evaporate in a normal manner. Thus, with the reduction in the amount of water in the concrete mix less voids are formed during the setting period.

Another object is to provide a method for producing a lightweight concrete having a comparatively smaller water content which will resist freezing and thawing when subjected to freezing temperatures during the setting or hardening period.

Another object is to provide a method of pre-treating aggregates of the lightweight variety for use in concrete mixes in which the concrete mix containing the pre-treated aggregates will possess a high degree of workability which is influenced by the nature and amount of the aggregates, the water content and the amount of cement in the mix. One of the aggregates pre-treated being coarse vermiculite, and by reason of its grain structure produces easy troweling and trowel slip.

Another object is to produce a pre-treated aggregate for use in concrete mixtures which will provide a concrete that can be worked into all corners of forms and molds, and which will not adhere to the walls of the mold or form after setting and hardening and which will leave the walls of the mold or form in a condition to permit easy cleaning, and which may be easily wiped with a cloth to remove small particles adhering to the walls.

Heretofore, various methods have been employed for treating lightweight aggregates for use in lightweight concrete but in so doing, certain desirable characteristics are sacrificed in attaining a final lightweight concrete.

In the present invention a mixture of different lightweight aggregates are used, one of which is vermiculite which is a lamellar structure of a mineral group possessing desirable characteristics for use in lightweight concrete mixtures and compositions. By reason of the lamellar structure of the vermiculite a series of air voids are present between the laminae which makes vermiculite an ideal lightweight aggregate for use in concerte mixtures. However, the vermiculite possesses the properties of absorbing large amounts of water from the concrete mix and thus renders the final concrete product weak and less durable. Its mineral nature, however, makes it comparably stable but is impaired when subjected to rough treatment and handling such as during mixing in the forming of the concrete of the lightweight type.

Further, vermiculite has the property of expanding when subjected to heat which increases its lightness, and in addition increases its volume. This is one reason why vermiculite, when used in concrete compositions, produces undesirable effects and is the reason why it has been treated by various chemicals in an attempt to adapt its finer qualities and attributes to use as a lightweight aggregate.

It has been found in practice that a lightweight aggregate for mixture with Portland cement and water can be formed by first coating a mixture of lightweight aggregate and coarse vermiculite with fuel oil which is applied to the granules of the lightweight aggregate and coarse vermiculite by either spraying or mixing the fuel oil directly with the batch of lightweight aggregate and vermiculite. The fuel oil may be of various commercial grades, and in addition to saturating and waterproofing the lightweight aggregate, it forms a coating on the coarse vermiculite which increases its waterproofing properties and seals the air voids against the escape of present moisture therein as well as absorption from moisture or free water in the concrete during hardening.

One instance of a fuel oil is "Bunker C" which is a residual fuel oil and is a petroleum fraction having a specific gravity of from 7.4 to 8.8 (American Petroleum Institute method at 60° F.); and a flash point (closed up) of from 205° F. to 212° F.

After the lightweight aggregate and coarse vermiculite have thus been thoroughly coated with the fuel oil, the mixture is then coated with Portland cement. This may be accomplished by dusting the cement or otherwise applying the same to the oil film coating on the aggregate particles in such a manner as to prevent clumping together of the aggregate particles so that clods are not formed. One method of obtaining this result is to tumble the aggregate particles after the Portland cement has been dusted or otherwise applied to the film coated particles. The mixture or composition of aggregate particles coated with the oil film and the outer coating of Portland cement is then allowed to dry for 48 hours until the cement coating has become hardened.

It is intended to mix lightweight aggregate and coarse vermiculite in the proportions 4:1, and the particular lightweight aggregate employed may depend upon the use to which the resultant concrete mixture is put. Various lightweight aggregates may be used with the coarse vermiculite such as well burned boiler house cinders, air cooled blast furnace slag or burned clay. Cinders are well adapted for lightweight concrete due to the porosity of the cinders and its comparable light weight (90 to 110 pounds per cubic foot, as compared with 140 to 150 pounds for stone or gravel aggregate). Slag from blast furnaces is relatively hard though porous of high compressive strength and provides a rough surface for adhesion of the film coating of fuel oil and the external coating of cement. Burned clay aggregates produce concretes of practically any desired strength and average about 100 pounds per cubic foot in weight. Burned clay aggregates are sold on the market under various trade names such as Haydite, Gravelite and various other names, in both fine and coarse grades.

In accordance with the present invention it has been found that considerable success can be attained by using an artificial lightweight aggregate including fine and coarse grades mixed with coarse vermiculite in the proportion of 4 cubic feet of lightweight artificial aggregate to 1 cubic foot of coarse vermiculite. The vermiculite may be in its natural or raw state and preferably, of a coarse grade in which 95 per cent will pass the sieve screen designating the largest size; not less than 40 or more than 75 per cent should pass a screen of half the largest size; not more than 10 per cent should pass a No. 4 sieve, nor more than 5 per cent a No. 8 sieve.

After the coarse and fine artificial lightweight aggregate has been mixed with the coarse vermiculite in a suitable mixer or agitator, one gallon of fuel oil of a commercial grade is mixed with the agitated mass of artificial lightweight aggregate and vermiculite (.1337 cubic feet) to coat the granules of the mixture with a thin film of protective fuel oil. The fuel oil film coats the smooth surfaces of the vermiculite as well as the lightweight artificial aggregate particles and in addition, slightly penetrates the surfaces of the artificial lightweight aggregate.

The fuel oil may be sprayed in the mixture of artificial lightweight aggregate and coarse vermiculite during its mixing in an agitator, or any other suitable means may be employed for conveniently coating the particles of the mixture of lightweight artificial aggregate and coarse vermiculite.

Finally, the oil coated particles of the artificial lightweight aggregate and coarse vermiculite are coated with cement. Approximately 4½ cubic feet of the artificial lightweight aggregate and coarse vermiculite is coated with ⅕ cubic foot of Portland cement. The coating of the Portland cement is applied to the oil film surface on the particles of the artificial aggregate and coarse vermiculite by dusting the Portland cement thereon to completely coat the particles. The dusting and the coating of the Portland cement on the oil coated particles of the lightweight aggregate and vermiculite can be carried out in a tumbling mill so that each particle will be completely coated with Portland cement. The Portland cement adheres to the particles of lightweight aggregate and coarse vermiculite by reason of the oil film thereon and the moisture content is sufficient to cause hydration and drying of the cement after a period of approximately 48 hours.

The above lightweight aggregate mixture may then be packaged in bags or other containers for subsequent use. When using the above mentioned aggregate mixture for a concrete job, ⅘ cubic foot of Portland cement is added to the dry lightweight aggregate mixture with the necessary amount of water to produce the desired workability.

The above process has been found through numerous tests and experimental work to be the only method that will produce lightweight workable concrete which has the qualities of low bleeding, minimum shrinkage and waterproofing qualities.

The fuel oil employed is a residual petroleum fraction which has a specific gravity of 7.4 to 8.8 (American Petroleum Institute method at 60° F.); and a flash point (closed cup) of from 205° F. to 212° F. It contains upon analysis, approximately 85% carbon and 10% hydrogen, the remainder being water, sulfur, nitrogen, ash etc. and is known as residual fuel oil "Bunker C."

I claim:

1. A method of processing a lightweight aggregate for use in concrete mixtures, consisting in mixing an artificial lightweight siliceous aggregate of the group consisting of well burned cinders, burned clay and blast furnace slag with coarse vermiculite, coating the particles of artificial lightweight siliceous aggregate with a film of residual fuel oil having a specific gravity of from 7.4 to 8.8 to cause said particles to be impregnated, applying Portland cement to the thus coated particles and finally allowing said Portland cement to dry to form a hard, thin, shell-like coating on the external surfaces of said lightweight artificial aggregate particles, said Portland cement being wetted by the moisture in the pores of the aggregate mixture which is expelled by the fuel oil impregnation, said cement being set by said expelled moisture.

2. A method of processing a lightweight aggregate for use in concrete mixtures, consisting in mixing an artificial lightweight siliceous aggregate of the group consisting of well burned cinders, burned clay and blast furnace slag with coarse vermiculite in the ratio 4:1, coating the particles of artificial lightweight siliceous aggregate with a film of residual fuel oil having a specific gravity of from 7.4 to 8.8 to cause said particles to be impregnated, applying Portland cement to the thus coated particles and finally allowing said Portland cement to dry to form a hard, thin, shell-like coating on the external surfaces of said lightweight artificial aggregate particles, said Portland cement being wetted by the moisture in the pores of the aggregate mixture which is expelled by the fuel oil impregnation, said cement being set by said expelled moisture.

CECIL F. SCHAAF.

References Cited in the file of this patent

UNITED STATES PATENTS

| Number | Name | Date |
|---|---|---|
| 1,762,267 | Freret | June 10, 1930 |
| 1,972,390 | Miner | Sept. 4, 1934 |
| 2,083,961 | New | June 15, 1937 |
| 2,397,083 | Bellamy | Mar. 26, 1946 |